United States Patent
Martín Bianchi et al.

(10) Patent No.: US 12,326,900 B1
(45) Date of Patent: Jun. 10, 2025

(54) CONTENT SIMILARITY DETECTION (CSD) COMPUTING PLATFORM AND SERVICE

(71) Applicant: Claravine, Inc., Lehi, UT (US)

(72) Inventors: Shai Martín Bianchi, Buenos Aires (AR); Shashi Kant, Everett, MA (US)

(73) Assignee: Claravine, Inc., Lehi, UT (US)

( * ) Notice: Subject to any disclaimer, the term of this patent is extended or adjusted under 35 U.S.C. 154(b) by 0 days.

(21) Appl. No.: 18/915,272

(22) Filed: Oct. 14, 2024

(51) Int. Cl.
*G06F 16/901* (2019.01)

(52) U.S. Cl.
CPC .................. *G06F 16/901* (2019.01)

(58) Field of Classification Search
None
See application file for complete search history.

(56) References Cited

U.S. PATENT DOCUMENTS

| | | | |
|---|---|---|---|
| 5,978,791 A | 11/1999 | Farber et al. | |
| 7,043,473 B1* | 5/2006 | Rassool | G06F 16/683 |
| 11,514,321 B1 | 11/2022 | Chen et al. | |
| 11,934,995 B1 | 3/2024 | Ren et al. | |
| 2003/0105716 A1 | 6/2003 | Sutton | |
| 2013/0108177 A1* | 5/2013 | Sukthankar | G06V 10/75 |
| | | | 382/218 |
| 2014/0040262 A1* | 2/2014 | Winter | G06F 16/355 |
| | | | 707/E17.046 |
| 2015/0178786 A1* | 6/2015 | Claessens | G06Q 30/0277 |
| | | | 705/14.66 |
| 2016/0103900 A1* | 4/2016 | Angelov | G06F 16/35 |
| | | | 707/602 |
| 2017/0286522 A1* | 10/2017 | Hohwald | G06F 16/438 |
| 2019/0236371 A1* | 8/2019 | Boonmee | G06V 10/764 |
| 2019/0303499 A1 | 10/2019 | Sharma | |
| 2019/0311219 A1 | 10/2019 | Alabdulmohsin | |
| 2019/0370282 A1 | 12/2019 | Vergnaud et al. | |
| 2021/0011944 A1 | 1/2021 | Kuroda | |
| 2022/0182723 A1 | 6/2022 | Kim et al. | |
| 2023/0024572 A1 | 1/2023 | Sato | |
| 2023/0370683 A1 | 11/2023 | Panchagnula | |
| 2024/0127079 A1 | 4/2024 | Agley et al. | |
| 2024/0168918 A1 | 5/2024 | Pham et al. | |

(Continued)

OTHER PUBLICATIONS

Openai, "Clip: Connecting text and images," Jan. 5, 2021, available at https://openai.com/index/clip/.

(Continued)

*Primary Examiner* — Scott A. Waldron
(74) *Attorney, Agent, or Firm* — David H. Judson (57) ABSTRACT

In this approach, a system and workflow are provided for generating unique content identifiers (sometimes referred to herein as "Content IDs") for digital assets. A Content ID is uniquely associated with each piece of content within a customer's asset space The Content ID need not be based on the contents of the asset (such as pixel values of an image), and both perceptual and non-perceptual aspects of identification of the asset may be evaluated to enable different permutations of the same digital asset to have different Content IDs. The system provides for content similarity detection by identifying a content match and surfacing this match within a customer data set, providing automated, scalable, and consistent Content IDs for multiple use cases associated with a digital asset management solution.

17 Claims, 3 Drawing Sheets

(56) References Cited

U.S. PATENT DOCUMENTS

2024/0192972 A1   6/2024  Soyarslan
2024/0411724 A1*  12/2024 Nagarajan ........... G06F 16/1748

OTHER PUBLICATIONS

Qdrant, "What is Qdrant?" 2024, available at https://qdrant.tech/documentation/overview/.
Qdrant, "User Manual: Concepts, Vectors" 2024, available at https://qdrant.tech/documentation/concepts/vectors/.

* cited by examiner

CONTENT SIMILARITY DETECTION (CSD) COMPUTING PLATFORM AND SERVICE

BACKGROUND OF THE INVENTION

Digital Asset Management (DAM) systems and tools enable businesses to organize, distribute, collaborate on, and securely store digital files that make up a digital asset library. Data management is the practice of managing data as a valuable resource to unlock its potential for an organization. Managing data effectively requires having a data strategy and reliable methods to access, integrate, cleanse, govern, store, and prepare data for analytics. To this end, DAM platforms typically provide for data orchestration, data mapping, dataset management, and data observability, and they also contain features such as permission controls, rights management, and asset performance analytics. While DAM solutions provide significant advantages, they have not been able to keep up with the exponential growth of content creation.

In particular, enterprise organizations are on the brink of an Artificial Intelligence (AI)-fueled content overload. With the new capabilities of Generative AI, brand and marketing teams can now create multiple permutations of campaign assets in mere moments. The ability to instantly produce dozens of variations of messaging and visuals will enable more effective marketing in the form of personalization and localization—but it will also lead to exponentially higher volumes of content that needs to be stored, managed, and accessed across distributed teams. For most organizations, this leads to a significant challenge, especially around content data standards. A data standard is an assembled collection of data components—fields, data types, taxonomies, validation rules, and mappings—that uniformly describe data to the expectation of data consumers.

A further data management problem is that today's enterprise organizations maintain a large number of content storage options—DAMs, CMSs (content management system), MAPs (marketing automation platform), cloud storage, project management tools, and more. Information about campaign performance is often splintered across disparate reporting dashboards and agency partners. This makes it very difficult for team members to locate specific assets when needed, to understand how content performs, or to discover relevant assets that could be reused or repurposed for new campaigns. Keeping content metadata consistent across these systems is already an enormous challenge, and the problem is becoming increasingly complex with the rapid adoption of Generative AI-based content creation.

Managing large volumes of assets in these types of environments is very challenging. There are often duplicative or very similar assets and contain no reference regarding what is used where. The management problem is exacerbated since naming conventions are typically not standardized, and assets often have incorrect or missing metadata and tags. This leads to confusion about which asset to use, ineffective performance tracking, poor search capabilities, and significant manual effort to maintain a DAM. The challenge increases when brands have multiple DAMs managed by different agencies or teams, all with little knowledge or what exists in each DAM.

SUMMARY OF THE INVENTION

A system and workflow are provided for generating unique content identifiers (sometimes referred to herein as "Content IDs") for digital assets. A Content ID is uniquely associated with each piece of content within a customer's asset space. The Content ID need not be based on the contents of the asset (such as pixel values of an image), and both perceptual and non-perceptual aspects of identification of the asset may be evaluated to enable different permutations of the same digital asset to have different Content IDs. The system provides for content similarity detection by identifying a content match and surfacing this match within a customer data set, providing automated, scalable, and consistent Content IDs for multiple use cases associated with a digital asset management solution.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF DRAWINGS

For a more complete understanding of the subject matter herein and the advantages thereof, reference is now made to the following descriptions taken in conjunction with the accompanying drawings, in which.

DETAILED DESCRIPTION OF THE INVENTION

Figure 1:
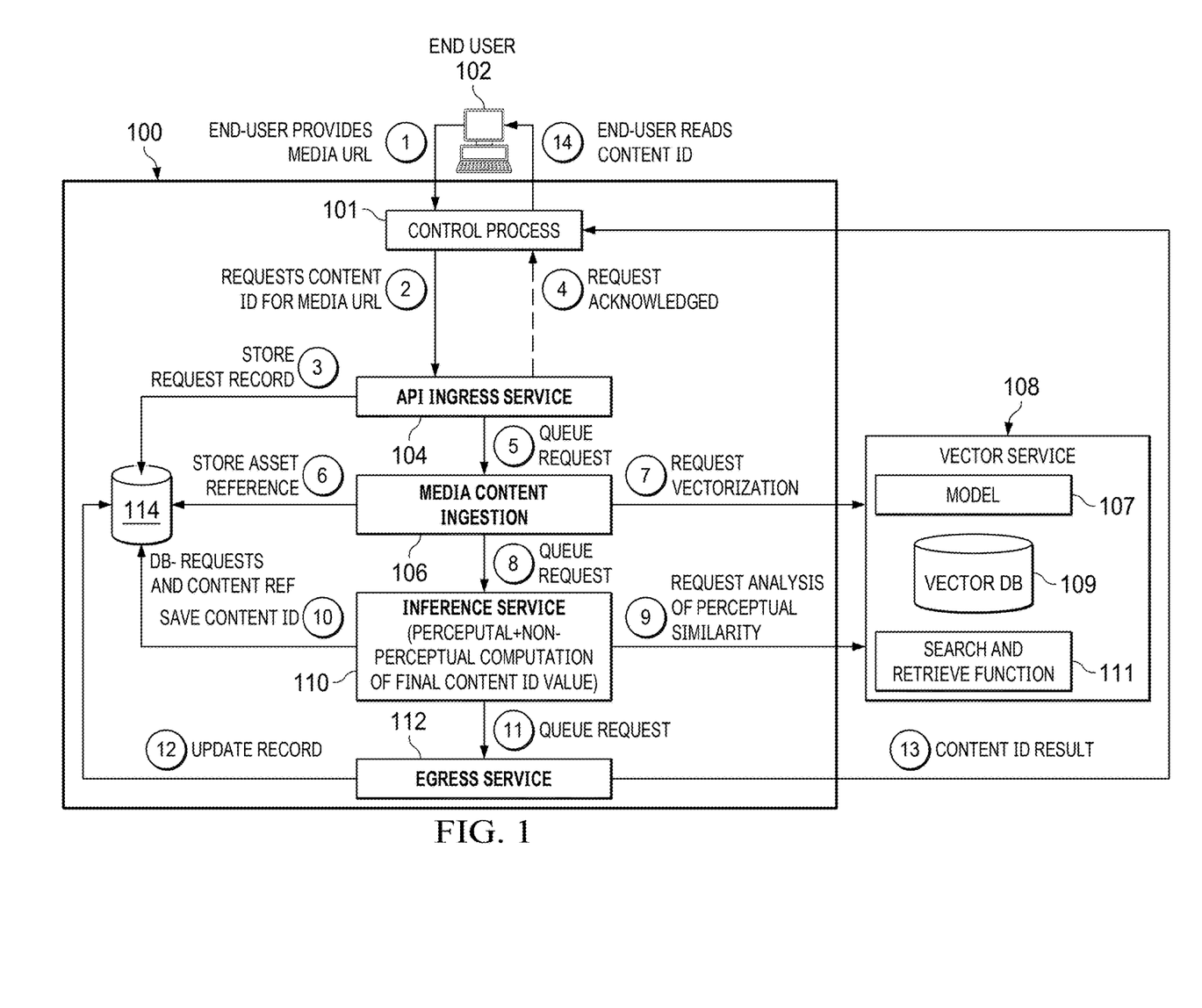
FIG. 1 depicts a computing platform and content similarity detection service workflow according to this disclosure.

FIG. 1 depicts a representative workflow of the system of this disclosure. As will be seen, this system provides a Content Similarity Detection (CSD) service. Typically, the service is multi-tenant based, and it is provided on behalf of each service customer (an organization or enterprise) that desires to enable its end users to obtain the service. The computing platform may be managed and operated by a service provider, although this is not a requirement. Although typically the platform is network-accessible, e.g., via the publicly-routed Internet, the computing system may be implemented in a standalone or on-premises manner, or in a hybrid computing environment that includes both on-premises and cloud-based infrastructure. In addition, one or more of the identified components may interoperate with some other enterprise computing system or application.

An individual end user accesses the system using a user application executing on a computing device (e.g., mobile phone, tablet, laptop or desktop computer, Internet-connected appliance, etc.). In a typical use case, a user application is a mobile application (app) that a user obtains from a publicly-available source, such as a mobile application storefront.

In this embodiment, which is representative, the system is network-accessible and executes as a computing platform. Generalizing, one or more functions of the computing platform of this disclosure may be implemented in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software-as-a-Service (Saas) (the provider's applications running on cloud infrastructure); Platform-as-a-Service (PaaS) (the customer deploys applications that may be created using provider tools onto the cloud infrastructure); Infrastructure-as-a-Service (IaaS) (customer provisions its own processing, storage, networks and other computing resources and can deploy and run operating systems and applications). The platform may comprise co-located hardware and software resources, or resources that are physically, logically, virtually and/or geographically distinct. Communication networks used to communicate to and from the platform services may be packet-based, non-packet based, and secure or non-secure, or some combination thereof. In a more specific embodiment, the platform comprises a set of services, each of which is typically implemented as a set of one or more configurable computing resources (e.g. networks, network bandwidth, servers, processing, memory, storage, applications, virtual machines, and services).

As depicted in FIG. 1, the computing platform 100 is accessible to an end-user 102, which may be a human, a file, a third-party integration (e.g., an Application Programming Interface (API)), or other. In this embodiment, the computing platform provides a set of services, namely an API ingress service 104, a media content ingestion service 106, a vector service 108, and inference service 110, and an egress service 112. A service may have a queue associated therewith that receives and queues work requests for execution by the service. A control process 101 is used to interact with these services, as will be described. The platform has an associated database, such as relational database 114. In a representative but non-limiting embodiment, the computing platform 100 facilitates enhanced digital asset management. As noted above, DAM offerings enable businesses to organize, distribute, collaborate on, and securely store digital files that make up a digital asset library. In this embodiment, the computing platform 100 provides certain additional services and functions for a DAM system, or other types of systems such as a CMS, a MAP, a custom marketing solution, and the like. A representative computing platform is The Data Standards Cloud® (TDSC) available from Claravine, Inc. of Lehi, Utah. TDSC is a platform and SaaS-based service that provides the capability for enterprise customers to standardize marketing metadata naming conventions, taxonomy, and related data. The identification of this commercial system is not intended to be limiting.

Content similarity detection as described herein may be a feature of a generalized content comprehension scheme. To this end, a representative content comprehension Application Programming Interface workflow is now described. At step (1), the end-user 102 makes a request to a main processing loop 101 of the computing platform 100. Typically, the request is an http-based request and in the form of a media URL. In the following description, and for convenience of illustration only, the digital asset is an image, and thus the media URL refers to that image. This is not to imply that the below-described workflow is only limited to images, as the techniques herein may be applied to images and other types of digital assets including, without limitation, video, audio, audio-to-text, and combinations thereof. Herein, and without intending to be limiting, the request is sometimes referred to as a content comprehension (CC) request. Typically, a CC request to the platform is an asynchronous event and produces results that are sent (e.g., on HTTP callback) to the URL specified by the requester in the request body.

Preferably, CC requests have one of two possible outcomes: (i) a success response on callback, or (ii) a client error response on callback. If an internal error occurs, preferably the request goes to a queue until the error is resolved. Referring back to FIG. 1, at step (2), the computing platform main processing loop 101 issues a request to the API ingress service 104 for a content identifier (Content ID) for the media URL. As used herein, a Content ID is a representation of a digital asset that the system uniquely associates with that asset. As will be described in more detail below, preferably a Content ID herein does not depend on the contents (e.g., the pixel values) of an asset (such as in an image), and there may be circumstances when the system uniquely associates different Content IDs to, say, a pair of digital assets that are perceived to be the same (such as logos that differ only in their resolution). In general, the computing platform 100 ingests assets and provides a Content ID for each that is unique, even if descriptors or characteristics (including, without limitation, media description, title, URL, or other metadata) differ.

As used herein, it is not required that a Content ID have some notion of universal uniqueness. Indeed, in an appropriate use case the Content ID may simply be unique in a given context, such as with respect to a given customer account. Given a typical use case wherein the platform is shared by multiple customer tenants, a given Content ID at the very least should be unique within each customer's asset space. In general, a Content ID should be generated using an algorithm that has high entropy and thus produces values that have a low chance of collision in the relevant space.

The computing platform performs content similarity detection by leveraging a model that is pre-trained to recognize assets of a same type or class as that of an asset of interest. In a representative (but non-limiting) embodiment, the asset type or class is an image, and the computing platform utilizes a model that has been pre-trained against a set of training data, such a large set of images retrieved from one or more data sets. In general, the model provides dimensionality reduction, namely, the transformation of data from a high-dimensional space into a low-dimensional space so that the low-dimensional representation retains some meaningful properties of the original data, ideally close to its intrinsic dimension. For image data, a representative model that provides this type of visual-based mapping is a neural network, such as OpenAI CLIP, OpenCLIP, ImageNet, ResNet50, X-CLIP, and others. A model of this type provides for a computer vision-based AI cluster analysis algorithm to assess the asset's perceptual uniqueness (e.g., its size, shape, orientation, quality, composition, etc.) before the system assigns a global identifier for that asset. The modeling approach herein, however, is not limited to use of deep learning, as other types of modeling that provide dimension reduction (e.g., UMAP, PCA, or the like) also may be used. Typically, there are multiple models available to the system, one for each particular digital asset type of class.

In a representative embodiment, and with respect to a given asset, a Content ID is determined (assigned) based on a form of cluster analysis. In this approach, the model is used to create embeddings, which are points in a vector space, for an asset that is to be analyzed for a Content ID. The analysis determines how closely those points cluster together. More formally, a vector corresponds to a point (element) in an n-dimensional vector space, as represented by $(x_1 \ldots x_n)$ coordinates. For example, the 2D coordinates of $(x, y)$ correspond to the case where the space has two dimensions. The clusters are determined, e.g., by considering a distance metric that is computable between each pair of points, and a distance threshold, which is configurable and may be pre-defined based on experimentation or other factors. Depending on the nature of the vector database, search heuristics that may or may not compute pairwise distances as well as other calculations while still providing accurate results may be leveraged in the identification of clusters of interest. Typically, a cluster is a group of vectors such that the distance between them is less than the threshold, although additional factors (such as relative position with respect to a center of gravity of a cluster) may also be considered in determining whether a particular point is within or outside of the cluster. In an embodiment where the model is based on a neural network such as OpenCLIP, a useful distance metric is a cosine similarity; different distance metric choices may be more appropriate for different models in different applications (e.g., Euclidean distance, Jaccard distance, combination distances, and the like), and the choice of a model and the choice of a distance metric are not necessarily interrelated in general. If the cluster analysis indicates that an input vector (for a digital asset in question) maps to an existing cluster, then the system has already "seen" the asset, and any Content ID associated with the asset is then just associated with the asset in question (in other words, no new Content ID is generated). But, if the cluster analysis indicates that the input vector does not map to an existing cluster, then the system has not seen the asset before, and a new Content ID is generated and associated with the asset.

With the above as background, the operation of the CC API is now further described in a typical use case involving images. In response to the request generated at step (2), and at step (3), the API ingress service 104 stores data from the incoming request into relational database 114 as a store request record. This enables the request payload to be used by downstream services in the workflow, and to be later used to provide a response to the request. At step (4), the API ingress service 104 issues a request acknowledgement back to the main processing loop 101 to indicate that the system is working on the request.

At step (5), the API ingress service 104 queues the request to the media content ingestion service 106. In a typical use case involving an image or video, media content ingestion stores the visual asset to a temporary data store (not shown). At step (6), the media content ingestion service 106 stores the asset reference, and in this example embodiment the asset reference is stored in the relational databases 114. At step (7), the media content ingestion service 106 requests a vectorization from the vector service 108, passing the asset to that service. The vector service 108 supports the model 107, and has an associated vector database 109. Based on the model, the vector service generates the vector for the asset that has been passed in from the media content ingestion service 106, and saves that vector in the vector database. As also depicted, the vector service 108 provides a search and retrieval function 111, in this case a fast and cost-efficient nearest neighbor search function, as will be described. At step (8), the media content ingestion service 106 queues the request to the inference service 110, which is the main processing function for obtaining a Content ID. To this end, and at step (9), the inference service 110 makes a request to the vector service 108 to initiate the nearest neighbor search function with respect to the vector that corresponds to the asset.

As explained above, the vector service 108 generates vectors, and reads and writes them to the associated vector database (DB) 109. Writing vectors to a vector database is not a requirement, but it facilitates storage, as well as fast and accurate nearest neighbor searches. The inference service 110 creates the Content ID. In operation, the vector database 109 does a closest neighbor analysis (approximate or exact) based on a distance metric. This analysis identifies a set of one or more top nearest neighbor vectors, which are potential cluster members for the asset in question. The vector service returns the top nearest neighbor vectors (potential cluster members) to the inference service 110. Then, the inference service 110 uses the top neighbor vectors returned by the vector service 108 to perform a cluster analysis using the distance threshold. The threshold is used to determine the relationship (if any) of the asset to pre-existing clusters. The threshold value may vary. (In an embodiment where cosine similarity is the distance metric, a distance threshold of 1.00 corresponds to a scenario wherein each cluster would have a maximum population size of 1). In the event that there is a positive membership outcome (in other words, that the asset is recognized as being a member of a pre-existing cluster), then the inference service 110 assigns the asset the Content ID of that closest cluster. Otherwise, and because the asset is not recognized as being a member of a pre-existing cluster, a cluster is considered to have been discovered, and the inference service 110 generates a new Content ID and assigns it to the asset.

The above-described cluster-based approach provides significant advantages here. In particular, the approach is very flexible in terms of identifying duplicates (as done for assigning Content IDs) but also identifying non-duplicate similars. To this end, the system is enabled for detection of duplicate assets (by configuring a certain, relatively high threshold value), as well as the detection of similar assets that are not duplicates of each other (by simply "lowering" that threshold value for such a "similarity" feature). Thus, both kinds of similarity detection are obtainable within a single implementation.

Referring now back to FIG. 1, at step (10), the inference service 110 saves the identified or newly-determined Content ID back to the database 114. At step (11), the inference service 110 queues the request to the egress service 112, indicating that a response to the request has been determined. At step (12), the egress service updates the asset reference in the database 114, thereby associating the Content ID with the request record. At step (13), the Content ID that results from the processing is returned back to the main processing loop 101. At step (14), the Content ID is returned to the end-user requester 102 to complete the processing of the original request.

Preferably, the system forgets assets after seeing them. To this end, the system permanently deletes the asset after the vectorization (step (7)), saving only the asset's embeddings for future identification of duplicates and similars. Thus, every asset that comes into the system is considered to not have a Content ID.

The above-identified workflow is carried out for each asset (in this example embodiment, for each image). In particular, and for each new asset, the described vectorization and inferencing algorithm embeds the asset in a vector space and checks whether its distance to a closest prior asset is within a threshold. If so, the asset is assigned the same Content ID as that prior asset; if not, the asset gets a new Content ID. This approach is advantageous because embeddings are robust to minor changes in the asset. As noted above, preferably the Content ID is not a function of the content. Further, and to ensure privacy, it is not required that the asset itself be stored in the system.

Although in a preferred embodiment the determination of the content identifier for an asset is vector-based, there may be particular assets or asset types wherein it is desirable to also employ a hash-based scheme. Thus, for example, for video assets, the system may deploy a hash-based scheme in combination with a vector-based scheme. In this example scenario, and given a video, the system generates content identifiers for individual frames of the video and then aggregates the frame-based (intermediate) results to a single result for the video. The single result is then assigned a Content ID. To produce a Content ID for each frame, the vector-based approach as described above may be used, with the frame then corresponding to an image.

As an alternative, a hash-based approach is used to generate a perceptual hash (e.g., using the pHash algorithm available from phash.org) for each frame (or some subset of the frames), and the hash values for a set of frames may then be concatenated and a hash taken over the result to produce the final value.

Combinations of these approaches, namely, generating a video Content ID based on vectorizing or hashing frames themselves and comparing vector sequences or hash sequences, may also be utilized.

In another approach, in lieu of vectorizing/hashing individual frames and then vectorizing/hashing a concatenation of vectors, an actual image produced out of a concatenation of frames—analogous to a classic film strip—may be processed (either by vectorizing or hashing) to produce a single vector or hash for the video. In this approach, a phash is taken over, or a vector is produced out of, the film strip, or perhaps a portion thereof.

Figure 2:
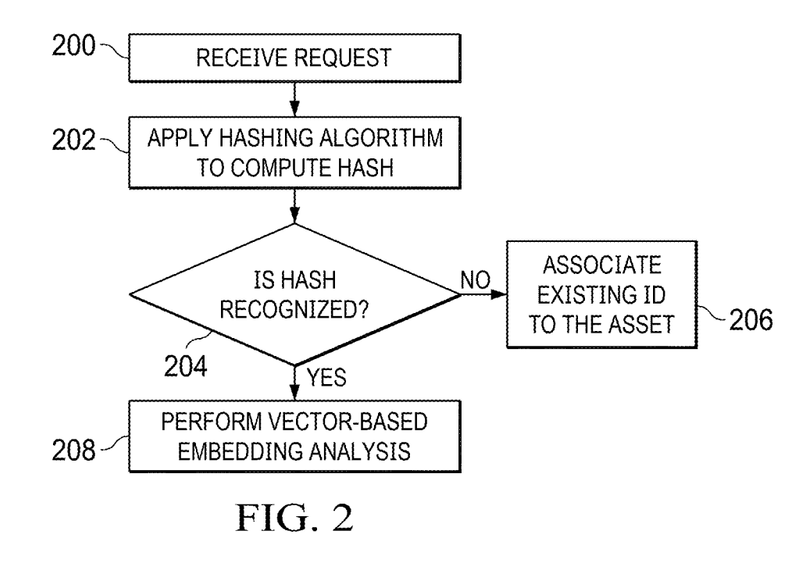
FIG. 2 depicts a process flow for generating a Content ID for a video.

Another use case involves a multi-pass technique wherein hashing is used initially to determine whether it is even necessary to carry out the vector-based analysis. This technique takes advantage of the fact that hashing is often less expensive (computationally-speaking) as compared to use of vector-based embeddings. FIG. 2 depicts the basic operation of this multi-pass technique upon receipt of a request associated with an asset. At step 200, the request is received. At step 202, a hashing algorithm (e.g., MD5, SHA-1, or the like) is applied to the content to generate a hash value. At step 204, a test is performed to determine whether the hash value is recognized by the system, e.g., as being the same as or within a certain threshold to an existing hash value in a library of hash values that is maintained by the system. If the result of the test is positive, which indicates such a match, then the routine branches to step 206 to associate an existing Content ID to the asset. In such case, the embeddings-based comparison approach is skipped. If, however, the result of the test at step 204 is negative because there is no match, the routine continues at step 208 to perform the vector-based operation as has been previously described with respect to FIG. 1. In this variant approach, the media content ingestion service 106 may be used to perform the hashing operation, with the resulting hash saved in the relational database 114, and the inference service 110 may be used to make the determination of the hash-versus-cluster outcome to generate the Content ID.

According to yet another variant, the system implements a "deterministic" layer on top of the model layer that complements the model output (be it vector-based or hash-based). This approach facilitates the Content ID generation and use, e.g., for scenarios where use-case rules are not only perceptual-based. For example, if an enterprise organization has two (2) different permutations of the same image asset, e.g., the very same image in two very different size categories, the above-described perceptual-based methods (whether vector and/or hash) might return the same Content ID. In the event, however, that the customer wants different Content IDs for the two images, e.g., because of how it may use them in different advertising campaigns, it may be desirable to also include a "non-perceptual" component to the Content ID generation. According to this variant, one or more non-perceptual categories are defined, and a particular asset may also be classified into these categories. The non-perceptual categories may vary and include, without limitation, characteristics such as size range, customer name, or other non-perceptual features or associations. The purpose of building non-perceptual aspects of identification into the Content ID generation is to distinguish visible assets that are otherwise visually (perceptually) equivalent, which is the case with permutations, e.g., the exact same image in two different size categories. Thus, and by leveraging both perceptual and non-perceptual aspects of identification, different permutations of the same digital asset can have different Content IDs assigned.

In this variant, a representative Content ID is then a hash (or digest) over a concatenation (or other function of) a perceptual ID (such as generated as described above) together with data obtained from the one or more non-perceptual categories. More formally, the Content ID for an asset then is a digest (or other function) computed over a set of values, namely, {perceptual_based_content_id, non-perceptual category (type 1 value, type 2 value 2, . . . type n value)}. The non-perceptual category data is a data string of zero or more category values. With respect to a given digest or other function, once the category types and their ordering are determined, the ordering must be invariant. This ensures that equal sequences of non-perceptual categories can always be identified as equal and outputting the same final digest. When non-perceptual categories are not used, the above computation defaults to equating the Content ID to the perceptual_based_content_id, as the latter portion is a null or empty set. As depicted in FIG. 1, the inference service 110 may also be used to compute the digest of this type.

Figure 3:
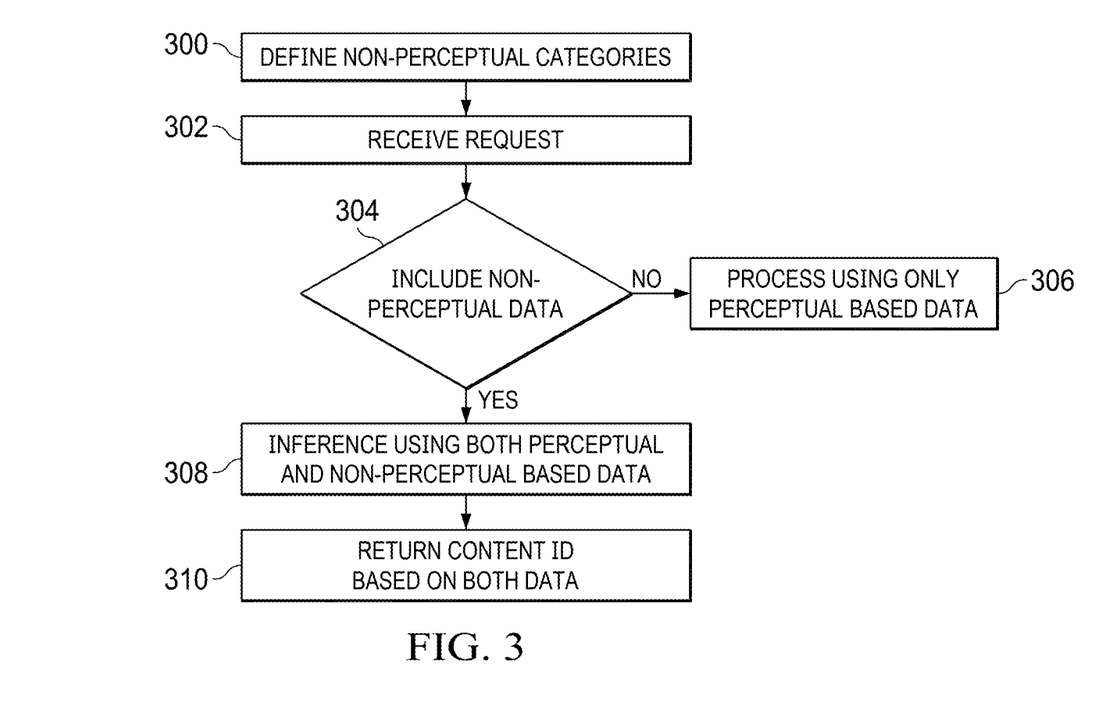
FIG. 3 depicts a process flow for an embodiment in which the Content ID generation involves both perceptual and non-perceptual components.

FIG. 3 depicts the workflow for the deterministic layer approach as described. At step 300, a set of non-perceptual categories are defined for a particular asset or asset class. At step 302, a request is received for a Content ID for an asset associated with the request. At step 304, a test is performed to determine whether the Content ID will include both perceptual and non-perceptual components. If the outcome of the test at step 304 is negative, only perceptual-based components are used, and the processing continues at step 306 in the manner previously described (whether vector-based and/or hash-based). If the outcome of the test at step 304 is positive, the routine continues at step 308 to carry out the inferencing on both perceptual and non-perceptual components. At step 310, the combination of the perceptual and non-perceptual components is then used to generate the Content ID for the asset in question.

Another variant approach that is useful especially for generating Content IDs for videos is use the perceptual hash computation to create a subset of videos to compare against, thereby reducing computation burden by running the vector similarity only across this subset instead of across the entire data.

The following provides additional details regarding the vector-based embedding technique as described above. In a scenario wherein the vector analysis for an image produces a cluster conflict, e.g., a result that overlaps into two or more clusters (such that the result is indeterminate with respect to those clusters), the distance threshold may be considered to be too high, in which case it may be decided or determined that the threshold should be adjusted downward (to be more constrained). Because the distance threshold is a system-wide threshold, preferably the system monitors occurrences of such cluster conflicts and uses the results of such monitoring to inform whether to update the system-wide threshold. In addition, or in lieu of modifying the distance threshold (in the use described above), the system may be configured to simply merge such separate clusters into a new cluster, in which case one of the Content ID values assigned to the separate clusters will be chosen and assigned to the new merged cluster. In another variant, e.g., where a given distance threshold is found to be too low (once again, preferably relying on the monitoring of cluster conflict occurrences), a given cluster may be broken up into two or more smaller clusters, in which case the Content ID value from the original cluster is retained by one of the new, smaller clusters, and a new Content ID value is assigned to each of the one or more other new, smaller clusters. Over time, or as a function of the use case or in response to a particular occurrence, the model used by the system or the type of distance metric may be updated or changed. Preferably, and when the CSD service is implemented in a service provider infrastructure that is shared by a number of tenants, a single vector space may be used for generating the Content IDs, but in such case preferably a filtering mechanism is applied (to the incoming requests at the front end of the workflow) to ensure that the vector analysis is only performed on clusters associated with a particular tenant. If a single vector space is used for generating the Content IDs, the filter is applied at the vector database level as opposed to at the front end of the workflow, e.g., by leveraging filtering options of a vector database's query engine.

One or more of the services and the vector database described above in FIG. 1 may be carried out in or otherwise implemented in a cloud compute infrastructure. A given service in the workflow may be implemented as a worker, and depending on the workflow requirements, the system may leverage demand-based auto-scaling of the necessary workers to optimize for cost while minimizing latency. In this type of implementation, preferably dependency and model caching are used as well. In addition, a Virtual Large Language Model (vLLM), such as cogVLM, may be used to generate embedding vectors.

Videos may also be compared in an embedding space. In an example use case, when a video clip is spliced into a larger clip, a pairwise comparison of vector embeddings may be carried out, and a similarity metric (such as a Tversky index, which is a type of Jaccard distance metric) may be utilized for video detection.

As also previously noted, audio can be embedded into a vector space much like videos and images. Thus, including audio in addition to visuals in the analysis of video similarity is a natural extension of the above-described analysis of video frames. In this embodiment, the processing carried out on video frames is also carried out on audio (namely, vectorize audio and use a metric distance and threshold (possible different than for video frames) to analyze clustering) and only decide that a video is a duplicate of a previous one if both video frames and audio are within the threshold distance of previous video and audio embeddings. In this scenario, each Video Content ID would be associated with an audio vector as well as video frame vector. A "video" as described herein may thus include an audio component.

There are many use cases for the content similarity detection service of this disclosure. In general, the above-described approach involves vectorizing a customer's assets, and then providing the vector and inferencing services within a workflow that generates (or otherwise associates an existing) Content ID to a particular asset, an asset that may or may not be one previously seen by the system. Various use cases include, without limitation, finding and deduplicating assets, facilitating a DAM migration, increasing DAM-to-DAM consistency, validating trafficked media, creating relationships between assets, content supply chain enhancement, ensuring content integrity, facilitating asset tracking and analytics, enabling data-driven decision making, enabling identification of high-performing content, and improving metadata sharing to facilitate enhanced content collaboration. More generally, the techniques herein facilitate or provide for a search and discovery mechanism to identify content with similar characteristics. The approach goes beyond simple label-based identification, and it allows for more nuanced and detailed analysis of content similarities, thereby enabling system users to uncover patterns and themes are important to content consumers. The technique herein preferably are delivered as or in association with a content comprehensive API service. Content IDs as described herein provide a consistent approach to metadata that can be applied across every layer of the technology stack, from DAMs to ad servers to the CMS. This unified approach to Content IDs allows teams to centralize data management across every system and removes the problems that come from individual teams trying to manually follow naming conventions across different platforms. By eliminating these manual processes, the asset management solution eliminates the possibility for human error, and it opens up new possibilities for improved measurement and optimization.

The Content ID for an asset that is generated according to the techniques herein may also be associated with one or more other identifiers generated in a marketing platform, with the resulting association then being considered the Content ID for the asset. In this embodiment, the one or more other identifiers comprise another type of non-perceptual category as previously described. In this variant, the resulting unique Content ID is then used to identify unique or similar assets within a customer account or across associated customer accounts if needed. The unique Content ID can also be used to identify or similar assets within an agency account or across agencies.

A system that implements that above-described technique may have an associated network-accessible dashboard to facilitate analytics, reporting and management. For example, a dashboard page may provide displays of information such as similarity listings (a descending list of Content IDs showing similar assets based on their position in the vector space), an asset linking list (providing URLs for the original source and the stored asset), a similarity scoring (assigning a similarity score to each compared asset, quantifying the level of resemblance), and the like.

A model as described herein may leverage an available computer vision model (e.g., such as ImageNet) or the model may be generated from a training data set using known deep learning methods and systems.

As noted above, preferably the Content ID is not a function of the content of the digital asset itself. The particular technique used to create the Content ID for a particular digital asset may vary. In one embodiment, the Content ID is a UUID (a globally-unique identifier) that is a random or pseudo-random number by a pseudo-random number generator. The nature of the UUID itself is not a limitation.

Aspects of this disclosure may be practiced, typically in software, on one or more machines or computing devices. More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a stand-alone machine, or across a distributed set of machines. A computing device connects to the publicly-routable Internet, an intranet, a private network, or any combination thereof, depending on the desired implementation environment.

As noted, one or more functions of the computing platform may be implemented in a cloud-based architecture. The platform may comprise co-located hardware and software resources, or resources that are physically, logically, virtually and/or geographically distinct. Communication networks used to communicate to and from the platform services may be packet-based, non-packet based, and secure or non-secure, or some combination thereof, Each above-described process or process step/operation preferably is implemented in computer software as a set of program instructions executable in one or more processors, as a special-purpose machine.

Representative machines on which the subject matter herein is provided may be hardware processor-based computers running an operating system and one or more applications to carry out the described functionality. One or more of the processes described above are implemented as computer programs, namely, as a set of computer instructions, for performing the functionality described. Virtual machines may also be utilized.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a non-transitory computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

There is no limitation on the type of computing entity that may implement a function or operation as described herein.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The functionality may be co-located or various parts/components may be separately and run as distinct functions, and in one or more locations over a distributed network.

Computing entities herein may be independent from one another, or associated with one another. Multiple computing entities may be associated with a single enterprise entity, but are separate and distinct from one another.

What is claimed is set forth below.

The invention claimed is:

1. A method of digital asset management in association with a digital asset management system, wherein a library of digital assets are represented as embeddings in an embedding space, wherein a given embedding is generated by a model trained to identify perceptual aspects of the digital asset, comprising:
   during a content comprehension Application Programming Interface (API) workflow:
      receiving a request associated with a new digital asset;
      responsive to receipt of the request, generating or associating a content identifier to the new digital asset by:
         issuing a query to identify a set of vectors in the embedding space, the set of vectors associated with digital assets within the library of digital assets that have a similarity to the new digital asset;
         in response to the query, receiving the set of vectors, and performing a cluster analysis using a vector associated with the new digital asset to determine whether the new digital asset has a given relationship to a digital asset within the library of digital assets;
         upon a determination that the new digital asset has the given relationship, associating an existing content identifier to the new digital asset;
         upon a determination that the new digital asset does not have the given relationship, associating a new content identifier to the new digital asset; and
         returning as a response to the request one of: the existing content identifier and the new content identifier, wherein the existing or new content identifier is generated by applying a function to a data string that comprises a perceptual component of the new digital asset and a non-perceptual component associated with the new digital asset, the non-perceptual component comprising a set of one or more non-perceptual data values in a given invariant order; and
   completing the content comprehension API workflow using the response.

2. The method as described in claim 1, wherein the existing content identifier or the new content identifier is not a function of content of the digital asset.

3. The method as described in claim 1, wherein the digital asset is one of: an image, a video, a video that includes audio, a video-to-text transcription, and combinations thereof.

4. The method as described in claim 1, wherein the model performs dimensionality reduction by mapping a high-dimensional space into a low-dimensional space.

5. The method as described in claim 1, wherein the existing or new content identifier is an identifier that is generated as a pseudo-random number.

6. The method as described in claim 1, wherein inclusion of the non-perceptual component ensures that the content identifier generated or associated to the new digital asset is unique irrespective of the new digital asset being a permutation of an existing digital asset in the library of digital assets.

7. The method as described in claim 1, wherein the existing or new content identifier is associated with at least two (2) permutations of a same digital asset.

8. The method as described in claim 1, wherein the query is made after determining that a content identifier for the new digital asset does not exist, wherein a determination that the content identifier for the new digital asset does not exist is based on applying a perceptual hash to the new digital asset and comparing a resulting perceptual hash to a set of hashes.

9. The method as described in claim 1, wherein the set of vectors in the embedding space are identified by a nearest neighbor search.

10. The method as described in claim 1, wherein the model is a neural network that has a distance metric, and wherein the distance metric is a cosine similarity.

11. The method as described in claim 1, wherein the content comprehension API workflow is associated with a task in the digital management system that is one of: digital asset management, digital asset deduplication, digital asset search and retrieval, digital asset migration, digital asset tracking, digital asset analytics, and digital asset collaboration.

12. The method as described in claim 1, wherein the embedding space is stored in a vector database.

13. The method as described in claim 1, further including applying a filter prior to issuing the query.

14. The method as described in claim 13, wherein the filter identifies a portion of the embedding space associated with a given tenant of a set of tenants.

15. The method as described in claim 1, wherein the digital asset is a video comprising a set of frames, and wherein the digital assets within the library of digital assets are image frames.

16. A computer program product in a non-transitory computer-readable storage medium, the computer program product comprising program code executable in one or more hardware processors associated with a digital asset management system to provide digital asset management of a library of digital assets represented as embeddings in an embedding space, wherein a given embedding is generated by a model trained to identify perceptual aspects of the digital asset, the program code executed during a content comprehension Application Programming Interface (API) workflow to:
   receive a request associated with a new digital asset;
   responsive to receipt of the request, generate or associate a content identifier to the new digital asset by:
      issuing a query to identify a set of vectors in the embedding space, the set of vectors associated with digital assets within the library of digital assets that have a similarity to the new digital asset;
      in response to the query, receiving the set of vectors, and performing a cluster analysis using a vector associated with the new digital asset to determine whether the new digital asset has a given relationship to a digital asset within the library of digital assets;
      upon a determination that the new digital asset has the given relationship, associating an existing content identifier to the new digital asset;
      upon a determination that the new digital asset does not have the given relationship, associating a new content identifier to the new digital asset; and
      returning as a response to the request one of: the existing content identifier and the new content identifier, wherein the existing or new content identifier is generated by applying a function to a data string that comprises a perceptual component of the new digital asset and a non-perceptual component associated with the new digital asset, the non-perceptual component comprising a set of one or more non-perceptual data values in a given invariant order; and
   complete the content comprehension API workflow using the response.

17. An apparatus associated with a digital asset management system that provides digital asset management of a library of digital assets represented as embeddings in an embedding space, comprising:
   one or more processors;
   computer memory storing program code executable in the one or more processors, the program code executed during a content comprehension Application Programming Interface (API) workflow to:
      receive a request associated with a new digital asset;
      responsive to receipt of the request, generate or associate a content identifier to the new digital asset by:
         issuing a query to identify a set of vectors in the embedding space, wherein a given embedding is generated by a model trained to identify perceptual aspects of the digital asset, the set of vectors associated with digital assets within the library of digital assets that have a similarity to the new digital asset;
         in response to the query, receiving the set of vectors, and performing a cluster analysis using a vector associated with the new digital asset to determine whether the new digital asset has a given relationship to a digital asset within the library of digital assets;
      upon a determination that the new digital asset has the given relationship, associating an existing content identifier to the new digital asset;
      upon a determination that the new digital asset does not have the given relationship, associating a new content identifier to the new digital asset; and
      returning as a response to the request one of: the existing content identifier and the new content identifier, wherein the existing or new content identifier is generated by applying a function to a data string that comprises a perceptual component of the new digital asset and a non-perceptual component associated with the new digital asset, the non-perceptual component comprising a set of one or more non-perceptual data values in a given invariant order; and
   complete the content comprehension API workflow using the response.

* * * * *